Aug. 29, 1967 — F. H. COLLINS — 3,339,006
METHOD OF THERMOFORMING FOAMED PLASTIC ARTICLES
Filed July 8, 1964
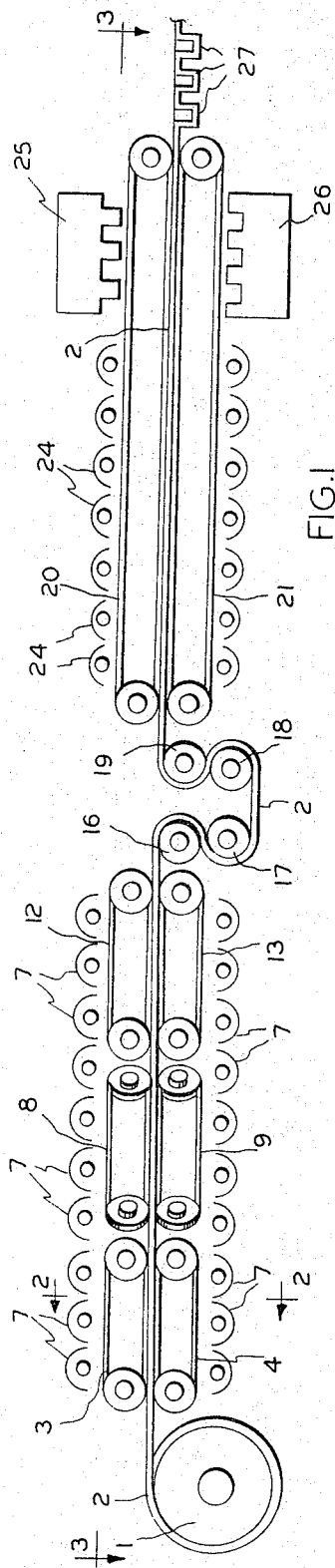
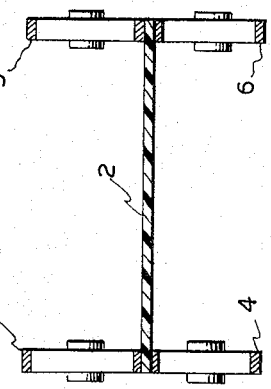
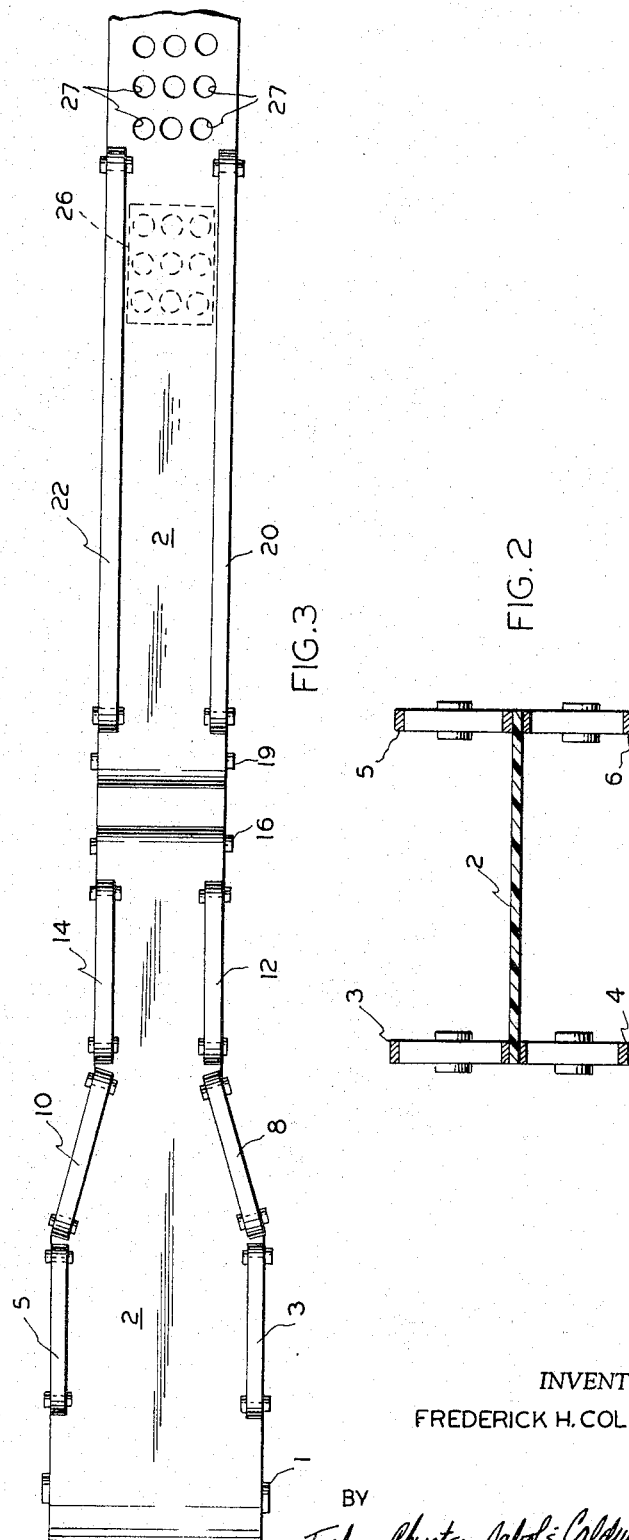
INVENTOR
FREDERICK H. COLLINS
BY Fisher, Christen, Sabol & Caldwell
ATTORNEYS they leave chain pairs 3, 4 and 5, 6. The converging chain pairs 8, 9 and 10, 11 respectively grip the side or free edges of sheet 2 in order to prevent them from curling and also to control the rate of lateral shrinkage.

3,339,006
METHOD OF THERMOFORMING FOAMED PLASTIC ARTICLES
Frederick H. Collins, Cedar Grove, N.J., assignor, by mesne assignments, to W. R. Grace & Co., New York, N.Y., a corporation of Connecticut
Filed July 8, 1964, Ser. No. 381,105
6 Claims. (Cl. 264—321)

The present invention relates to methods of forming articles from sheets of polystyrene foam and, more specifically, relates to the production of deep-drawn articles, such as thermally insulated drinking cups. Still more specifically, the invention relates to treatments of a polystyrene foam sheet prior to forming it into desired articles.

Heretofore, polystyrene foam sheets were extremely difficult to form into useful articles, especially deep-drawn articles such as thermally insulated cups. This difficulty became greater as the depth of the article exceeded the diameter thereof. For example, a cup 3 inches deep and having a 2 inch diameter at the lip is extremely difficult to form from polystyrene foam sheets by prior art methods. The specific difficulty arising is the rupturing of the sheet as the deep draw exceeds the diameter or cross-sectional dimension of the draw.

The difficulty appears to arise from the peculiar characteristics of low density thermoplastic foams produced by the tubular method of extrusion. Such sheets do not have the apparent stretchability needed for permitting formation of deep-drawn articles therefrom. As a result, such low density sheets rupture during deep forming and, consequently, are severely limited in their application to the production of drawn articles. Heating such sheets to higher temperatures within the limits of tolerance thereof is not enough to avoid the problem of lack of stretchability. Likewise, the use of thermoplastic foam sheets which have been produced with greater thicknesses does not minimize or eliminate the problem of low stretchability and ease of rupturing.

While it may be possible to tolerate the lack of stretchability and tendency to rupture of thermoplastic foam sheets by, for example, spacing the drawing dies a greater distance apart so as to supply more foam sheet in an attempt to make up for the lack of stretchability, such efforts are not entirely successful and, in addition, give rise to extremely large amounts of scrap. Furthermore, although such scrap might be reused, it is not capable of producing a first grade thermoplastic foam sheet. In any event, large amounts of scrap contribute to increased costs without providing any commensurate advantage.

Thermoplastic foam sheets produced by the tubular method possess an excellent appearance (including a minimal amount of, or complete lack of, wrinkles), the smallest possible cell size, good heat insulating properties and good cushioning properties. Such characteristics of the order of magnitude obtained by using the tubular method are not obtainable by other presently known methods of manufacturing thermoplastic foam sheets.

Theretofore, conventional forming equipment and methods were designed to hold a thermoplastic foam sheet against shrinkage in any direction while heating the sheet. In this respect, chain pairs which grip the side edges of said sheet were employed and, in some cases, tentering frames of the type normally employed in the textile industry have been employed for this purpose.

It is, therefore, an object of the present invention to provide methods and apparatus for treating thermoplastic foam sheets prior to forming the same into drawn articles so as to render such sheet more readily formable.

A further object is the provision of methods and apparatus for forming polystyrene foam sheets into drawn articles, especially deep-drawn articles, without rupturing said sheet and/or without producing large amounts of scrap.

A further object is to provide methods and apparatus for forming polystyrene foam sheets into relatively deep-drawn articles without the necessity of overheating said sheets or utilizing sheets formed with unduly large thicknesses.

Further objects and advantages will be apparent from the following detailed description taken in conjunction with the appended drawings, in which:

FIG. 1 is a schematic side elevational view of apparatus for carrying out the present invention;

FIG. 2 is a section on line 2—2 of FIG. 1; and

FIG. 3 is a schematic plan view of the apparatus shown in FIG. 1.

The present invention relates to the novel method of treating thermoplastic foam sheets, such as polystyrene foam sheets, so as to render them readily deformable and comprises the pretreating operation of heating said sheets in the usual manner while, however, permitting them to shrink laterally while holding the edges thereof so as to avoid curling of said edges and, thereafter, permitting said sheet to shrink longitudinally across substantially the entire width thereof.

Referring to FIGS. 1 through 3, there is shown schematically a roll 1 of polystyrene foam sheet 2, for example, having a density of 3 to 7 pounds per cubic foot. The sheet 2 is fed into the nip of parallel chain pairs 3, 4 and 5, 6 wherein the side edges or free edges of said sheet are gripped between the matching chains of each said respective chain pair. At the same time, heating lamps 7 disposed above and below the sheet 2 heat said sheet.

As the sheet is heated, it increasingly tends to shrink and converging chain pairs 8, 9 and 10, 11 are positioned so as to receive said sheet as they leave chain pairs 3, 4 and 5, 6. The converging chain pairs 8, 9 and 10, 11 respectively grip the side or free edges of sheet 2 in order to prevent them from curling and also to control the rate of lateral shrinkage.

The sheet 2 reaches a stage where there is no further tendency for it to shrink laterally. At this point, converging chain pairs 8, 9 and 10, 11 release the free edges of the sheet and parallel chain pairs 12, 13 and 14, 15 grip said side edges.

Thereafter, the sheet 2 is released by parallel chain pairs 12, 13 and 14, 15 and passed around an upper roll 16 and into the nip formed by said upper roll and matching lower roll 17. It passes around said lower roll and thence substantially horizontally to a lower roll 18 spaced from said lower roll 17. It passes around said roll 18 and into the nip formed between said lower roll 18 and matching upper roll 19. Rolls 16 and 17 are rotating at approximately the same peripheral speed and rolls 18 and 19 are operating at the same peripheral speed, which is lower than that of rolls 16, 17. As a consequence, the sheet extending between rolls 16, 17 and rolls 18, 19 is permitted to shrink longitudinally but in a controlled manner. As shown in FIG. 1, rolls 16 and 19 are turning in the same rotational direction (clockwise, as shown) and rolls 17 and 18 are turning in the same but opposite rotational direction (counterclockwise, as shown).

After leaving roll 19, the sheet, while still in heated condition, is gripped by a third set of parallel chain pairs 20, 21 and 22, 23 and are further heated by heating lamps 24 positioned above and below said chain pairs. Thereafter, while still gripped by chain pairs 20, 21 and 22, 23, the sheet 2 passes between upper forming die 25 and lower forming die 26 which are adapted to approach each other with said sheet therebetween and, consequently, deform said sheet into articles, i.e., drinking cups 27. Chain pairs 20, 21 and 22, 23, heating lamps 24 and forming dies 25 and 26 can all be part of conventional forming apparatus. Illustratively suitable forming apparatus is described in co-pending United States patent application Ser. No. 145,541 for "Forming Machine and Process," filed Oct. 13, 1961, now U.S. Patent No. 3,189,399, issued June 15, 1965.

In operation and by way of illustration, a polystyrene foam sheet 2 having a density of 7 pounds per cubic foot, a width of 24 inches and a thickness of 0.15 inch was fed from roll 1 into the nips of chain pairs 3, 4 and 5, 6 and heated while held thereby. As the sheet 2 reached the converging chain pairs 8, 9 and 10, 11, its surface temperature had been raised to about 225° F., and its density was 5 pounds per cubic foot and its thickness in the areas between said chain pairs was 0.21 inch. The sheet 2 entered the nips formed by converging chain pairs 8, 9 and 10, 11 and was permitted to shrink while gripped by said chain pairs to a width of 19 inches as it left said converging chain pairs. At this point, the density of the sheet was 5 pounds per cubic foot, its thickness was 0.26 inch and the surface temperature of the sheet was approximately 230° F.

The sheet 2 then entered the nips formed by chain pairs 12, 13 and 14, 15 for further heating. Thereafter, the sheet left said chain pairs at a temperature of about 230° F. and passed around roll 16 and into the nip formed by rolls 16 and 17. Thereafter, it passed around roll 17 for a short horizontal distance of 8 inches as measured from its contact with roll 17 until its point of contact with roll 18. Rolls 16 and 17 were rotating at a peripheral speed of 240 inches per minute and rolls 18 and 19 were rotating at a peripheral speed of 200 inches per minute, thus permitting 2 inches longitudinal shrinkage per foot of sheet 2 fed to rolls 16, 17. The sheet 2 passed around roll 18 and into the nip formed between rolls 18 and 19 and thence around roll 19 into the nips formed by the chain pairs 20, 21 and 22, 23.

As it entered such nips, its density was 5 pounds per cubic foot, its thickness was 0.310 inch, its surface temperature was 225° F., and its width was 19 inches. While gripped between chain pairs 20, 21 and 22, 23, the sheet 2 was heated to its highest temperature of 250° F. and formed by cooled dies 25, 26 into drinking cups 27 having a density of 6 pounds per cubic foot, a wall thickness of .06 inch, a depth of 4 inches and a diameter of 3 inches at the lip thereof.

The present invention is advantageously applied to polystyrene foam sheets made by any of the known methods but is especially advantageously applied to polystyrene foam sheets having densities in the range of 5 to 12 pounds per cubic foot, thicknesses of 0.03 to 0.15 inch as made by processes described, referred to, and/or claimed in co-pending patent application Ser. No. 145,524, filed Sept. 27, 1961, by William A. Jacobs and Frederick H. Collins now U.S. Patent No. 3,151,192, issued Sept. 29, 1964. The temperature to which polystyrene foam sheets must be heated prior to lateral shrinkage is not narrowly critical and can vary from 200 to 275° F., for example. If desired, the sheet can be heated to the ultimate forming temperature by the time the sheet reaches the converging chain pairs 8, 9 and 10, 11 and subsequent heating simply employed to maintain the sheet at its forming temperature. Alternatively, the sheet can be heated, prior to said converging chain pairs, to a temperature below the forming temperature but sufficiently high to induce shrinkage thereof; e.g., a temperature in the range of 200 to 250° F. usually induces shrinkage in polystyrene foam sheets. Heat applied after said converging chains can then elevate the temperature of the sheet from the shrinkage temperature to the desired forming temperature. Any suitable heating schedule can be employed.

In addition, instead of the chain pairs 3, 4 and 5, 6; 8, 9 and 10, 11; 12, 13 and 14, 15; and 20, 21 and 22, 23; tenter frames similar to those employed in the textile industry are useful.

In place of the chain pairs 3, 4 and 5, 6; 8, 9 and 10, 11; and 12, 13 and 14, 15; rolls 16, 17 and 18, 19, several parallel rollers spaced both vertically and horizontally from adjacent rollers can be employed, in which case the sheet 2 is threaded alternately over and under successive rollers. The rollers further along travel at a slower peripheral speed than the initial rollers, in the similar manner that rolls 18, 19 rotate at a lesser peripheral speed than rolls 16, 17, thus permitting longitudinal shrinkage. With this arrangement, curling of the edges of sheet 2 is avoided and shrinkage is obtained in both lateral and longitudinal directions.

It is to be understood that the above description is by way of example only and that details for carrying the invention into effect may be varied without departing from the scope of the invention.

What is claimed is:

1. In the method of forming articles from a sheet of thermoplastic foam by heating said sheet to render it deformable, then deforming the heated sheet into said article and cooling it to set it; that improvement in the heating step comprising permitting said sheet to shrink laterally during heating while restraining said sheet from curling inwardly and permitting said sheet to shrink longitudinally.

2. In the method of forming articles from a long sheet of thermoplastic foam by heating said sheet to render it deformable, then deforming the heated sheet into said article and cooling it to set it; that improvement in the heating step comprising permitting said sheet to shrink laterally during heating while holding the free edges thereof in substantially coplanar disposition and thereafter permitting said sheet to shrink longitudinally across its substantially entire width.

3. Improvement as claimed in claim 1 wherein said thermoplastic foam sheet is polystyrene foam sheet.

4. Improvement as claimed in claim 2 wherein said thermoplastic foam sheet is polystyrene foam sheet.

5. Improvement as claimed in claim 4 wherein said sheet is permitted to shrink longitudinally between the respective nips of two pairs of rolls, each pair having a peripheral speed different from that of the other pair.

6. Method of forming articles from a long sheet of polystyrene foam comprising the steps of heating said sheet while holding the free edges thereof in substantially coplanar disposition; permitting said sheet to shrink laterally while holding the free edges thereof in substantially coplanar disposition; passing said sheet in heated condition into the nip of a first pair of rolls and thence into the nip of a second pair of rolls, said second pair of rolls rotating at a slower peripheral speed than that at which said first pair of rolls is rotating; thereafter forming said sheet into said articles while holding the free edges thereof.

References Cited

UNITED STATES PATENTS

| | | | |
|---|---|---|---|
| 3,068,525 | 12/1962 | Linton et al. | 264—324 |
| 3,139,470 | 6/1964 | Prengle et al. | 264—289 |
| 3,189,399 | 6/1965 | Jacobs et al. | 264—321 XR |

OTHER REFERENCES

Collins, F. H.: "Controlled Density Polystyrene Foam Extrusion," in SPE Journal, July 1960, pp. 705–709.

ALEXANDER H. BRODMERKEL, *Primary Examiner.*

P. E. ANDERSON, *Assistant Examiner.*